May 22, 1928.

A. DUMKE 1,671,018

DIRECTION INDICATOR

Filed July 28, 1926    2 Sheets-Sheet 1

August Dumke INVENTOR
BY *Victor J. Evans*
ATTORNEY

R. G. Thomas

WITNESS:

May 22, 1928. 1,671,018
A. DUMKE
DIRECTION INDICATOR
Filed July 28, 1926 2 Sheets-Sheet 2
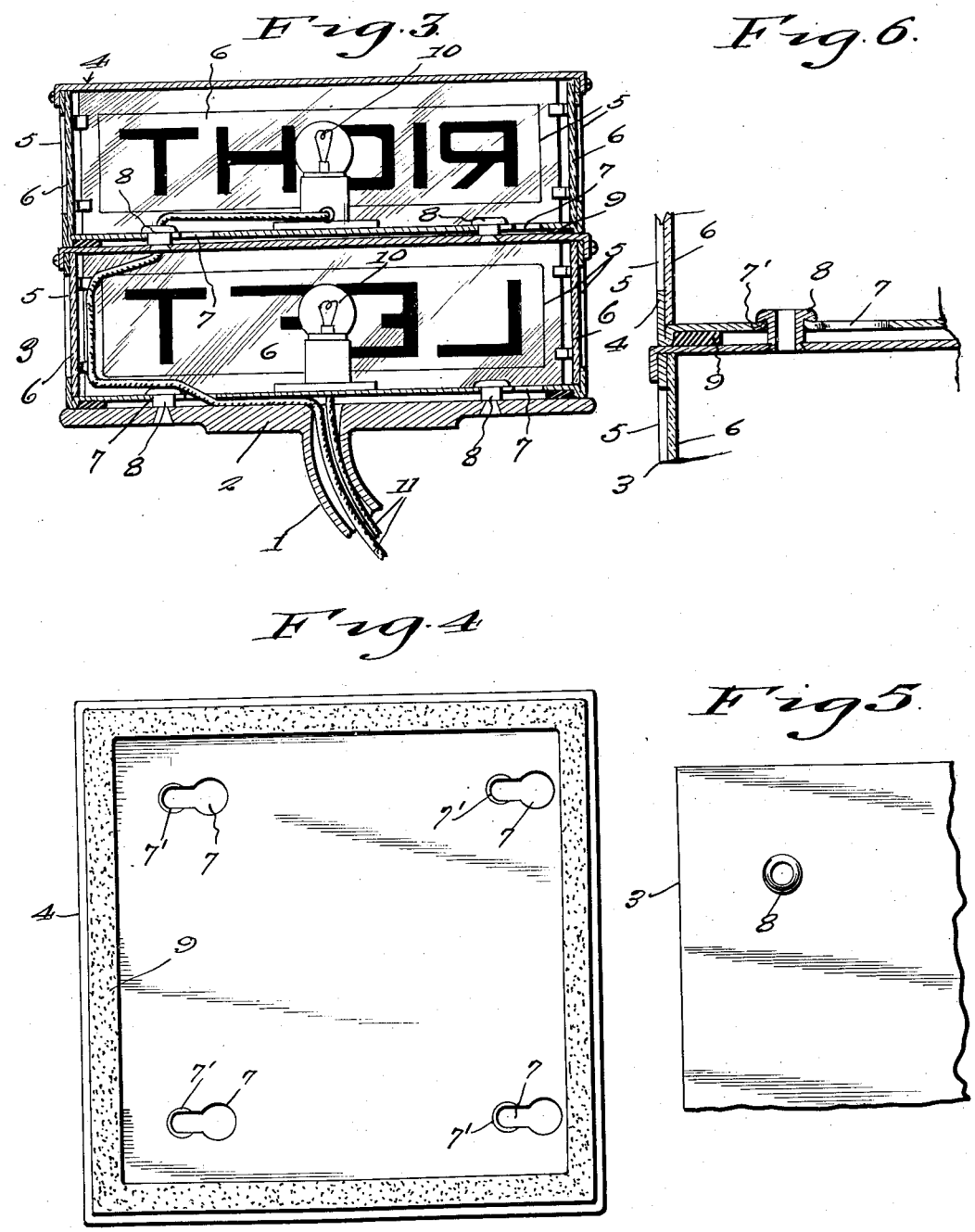

Patented May 22, 1928.

1,671,018

UNITED STATES PATENT OFFICE.

AUGUST DUMKE, OF MITCHELL, SOUTH DAKOTA.

DIRECTION INDICATOR.

Application filed July 28, 1926. Serial No. 125,562.

This invention relates to a signal for a motor vehicle, the general object of the invention being to provide a signal which can be seen by the drivers of other vehicles and by pedestrians coming from all directions, the signal indicating the intentions of the driver to turn to either the right or left.

Another object of the invention is to so construct the signal casing that the parts thereof are easily accessible for cleaning, repairing and renewing of lamps.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is an enlarged sectional view through the signal itself.

Figure 4 is a bottom plan view of the upper casing.

Figure 5 is a fragmentary top plan view of the lower casing.

Figure 6 is a fragmentary sectional view through the corners of the two casings.

Figure 1:
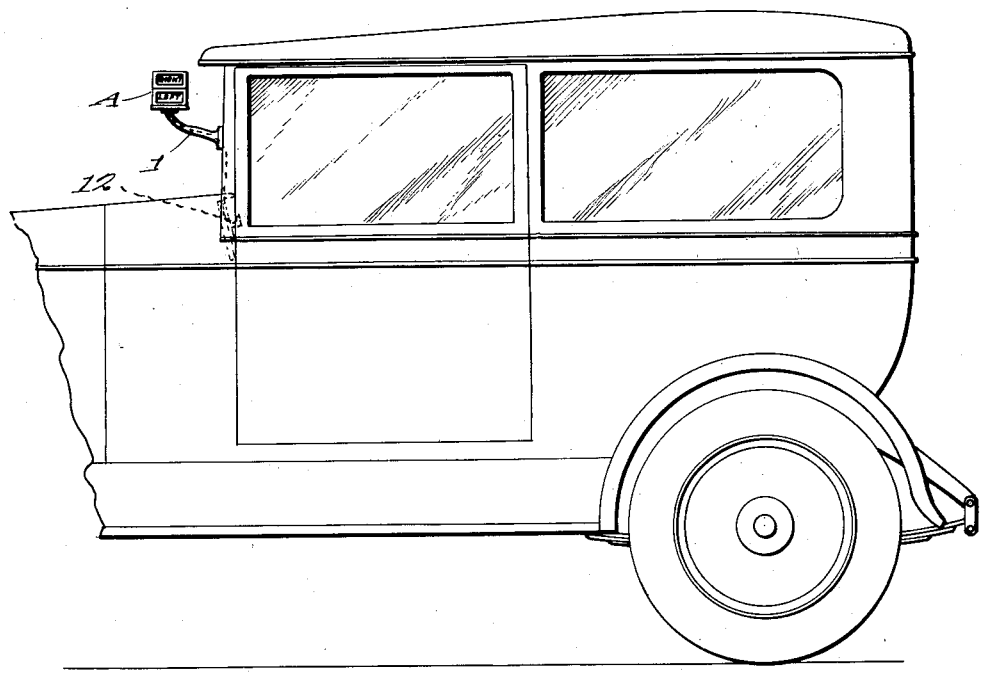
Figure 1 is a view showing the signal in use.
Figure 2:
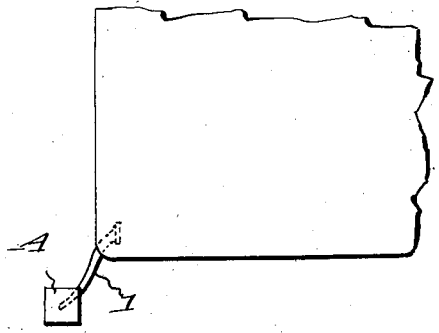
Figure 2 is a fragmentary top plan view of Figure 1, showing the position of the signal.
Figure 7:
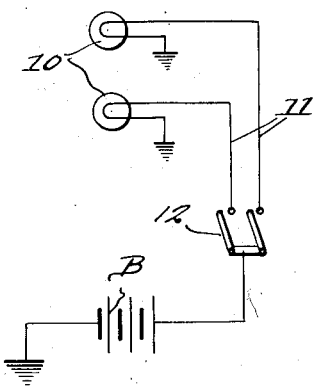
Figure 7 is a diagrammatic view of the circuits.

As shown in Figures 1 and 2, the signal device A is supported by a bracket 1 at the left hand corner of the vehicle, the bracket extending forwardly and outwardly from the corner so that the signal can be seen by cars coming toward the vehicle carrying the signal, from the front and rear and from the right and left.

The signal device A comprises a base 2 which is formed with or attached to the outer end of the bracket, and the two casings 3 and 4. Each casing is preferably formed of metal, with an opening 5 in each side thereof which is covered by a plate 6 of transparent material, the plates in the lower casing each containing the word "Left", while those in the upper casing each contain the word "Right". The bottom of each casing is provided with four key-hole shaped slots 7 arranged in the corners of the casing and the base 2 and the top of the lower casing are each provided with four headed studs 8 for engaging the slots for connecting the lower casing with the base and the upper casing with the lower casing. Thus the lower casing is detachably connected with the base by the headed studs engaging the slots and the upper casing is detachably connected with the lower casing in the same manner.

The narrow part of each slot has its walls bent outwardly, as at 7', to engage the undercut lower part of the head of each stud, as shown in Figure 6, so as to lock the stud in said narrow part of the slot by friction.

A gasket 9 is placed on the bottom of each casing to make a tight joint between said bottom and the part upon which the casing rests and also to prevent rattling of the parts.

A lamp 10 is placed in each casing and the conductors 11 pass from the switch 12 on the dash or instrument board through the bracket into the casings and are electrically connected with the lamps. The conductor of the lamp in the top casing passes through one of the studs 8 and through one of the slots 7 of the lower casing. The switch 12 is connected with the battery B or other source of current.

From the foregoing, it will be seen that I have provided signal means for indicating when the car is to be turned to the right or left and which is so arranged that the signals can be seen by drivers of other vehicles and by pedestrians coming from all directions toward the vehicles supplied with the signal. The parts of the signal can be easily taken apart so that the lamps can be renewed or the parts cleaned and repaired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A signal of the class described comprising a hollow bracket, a flat rectangular base connected with the bracket and having a central opening therein communicating with the interior of the bracket, a signal casing of rectangular shape and slightly smaller than the base with a depending flange at the sides of the casing which rest upon the base, a rectangular gasket placed between the base and the bottom of the casing with its outer edges resting against the flange, a second signal casing of the same shape as the first casing having its flange resting upon the top of the first casing, means for detachably connecting the first casing with the base, means for detachably connecting the second casing with the top of the first casing, a lamp in each casing and conductors for the lamp passing through the bracket and the opening in the base into the casings.

In testimony whereof I affix my signature.

AUGUST DUMKE.